United States Patent [19]
Nashimoto

[11] Patent Number: 6,025,864
[45] Date of Patent: Feb. 15, 2000

[54] OPTICAL SCANNING DEVICE AND IMAGE FORMING APPARATUS

[75] Inventor: Keiichi Nashimoto, Minami-Ashigara, Japan

[73] Assignee: Fuji Xerox Co., Ltd., Tokyo, Japan

[21] Appl. No.: 08/763,260

[22] Filed: Dec. 10, 1996

[30] Foreign Application Priority Data

Dec. 14, 1995 [JP] Japan ................................. 7-325832

[51] Int. Cl.⁷ ........................................................ G02B 6/10
[52] U.S. Cl. ............................ 347/243; 347/239; 347/241
[58] Field of Search ...................................... 347/243, 239, 347/241, 129, 134, 135; 359/258, 254, 245; 385/8, 10

[56] References Cited

U.S. PATENT DOCUMENTS

| | | | |
|---|---|---|---|
| 4,614,408 | 9/1986 | Mir et al. | 359/250 |
| 4,652,722 | 3/1987 | Stone et al. | 347/244 X |
| 4,693,548 | 9/1987 | Tsunoi | 347/243 X |
| 4,897,671 | 1/1990 | Mahapatra et al. | 347/241 |
| 5,444,567 | 8/1995 | Kataoka | 385/8 X |
| 5,475,416 | 12/1995 | Kessler et al. | 347/244 |
| 5,677,970 | 10/1997 | Nashimoto | 385/7 |

FOREIGN PATENT DOCUMENTS

| | | |
|---|---|---|
| 52-68307 | 6/1977 | Japan . |
| 62-47627 | 3/1987 | Japan . |
| 63-64765 | 3/1988 | Japan . |
| 3-121425 | 5/1991 | Japan ........................ G02F 1/335 |
| 7-176939 | 7/1995 | Japan . |

OTHER PUBLICATIONS

Q. Chen, et al.; "Guided–Wave Electro–Optic Beam Deflector using Domain Reversal in $LiTaO_3$", Journal of Lightwave Technology, vol. 12, No. 8, Aug. 1994, pp. 1401–1404.
C.S. Tsai, IEEE Transaction on Circuits and Systems, vol. CAS–26, No. 12, Dec. 1979, pp. 1072–1098.

*Primary Examiner*—N. Le
*Assistant Examiner*—Lamson D. Nguyen
*Attorney, Agent, or Firm*—Oliff & Berridge, PLC

[57] ABSTRACT

An optical scanning device for deflecting a plurality of light beams is disclosed. The device includes a plurality of deflection means for deflecting each of the plurality of light beams. The means are formed in a thin film waveguide, and distributes a refractive index of the waveguide by an electro-optic effect according to input signals to cause diffraction due to the distributed refractive index, thereby deflecting a plurality of light beams.

17 Claims, 12 Drawing Sheets

$\theta \geqq \theta_T = \sin^{-1}$

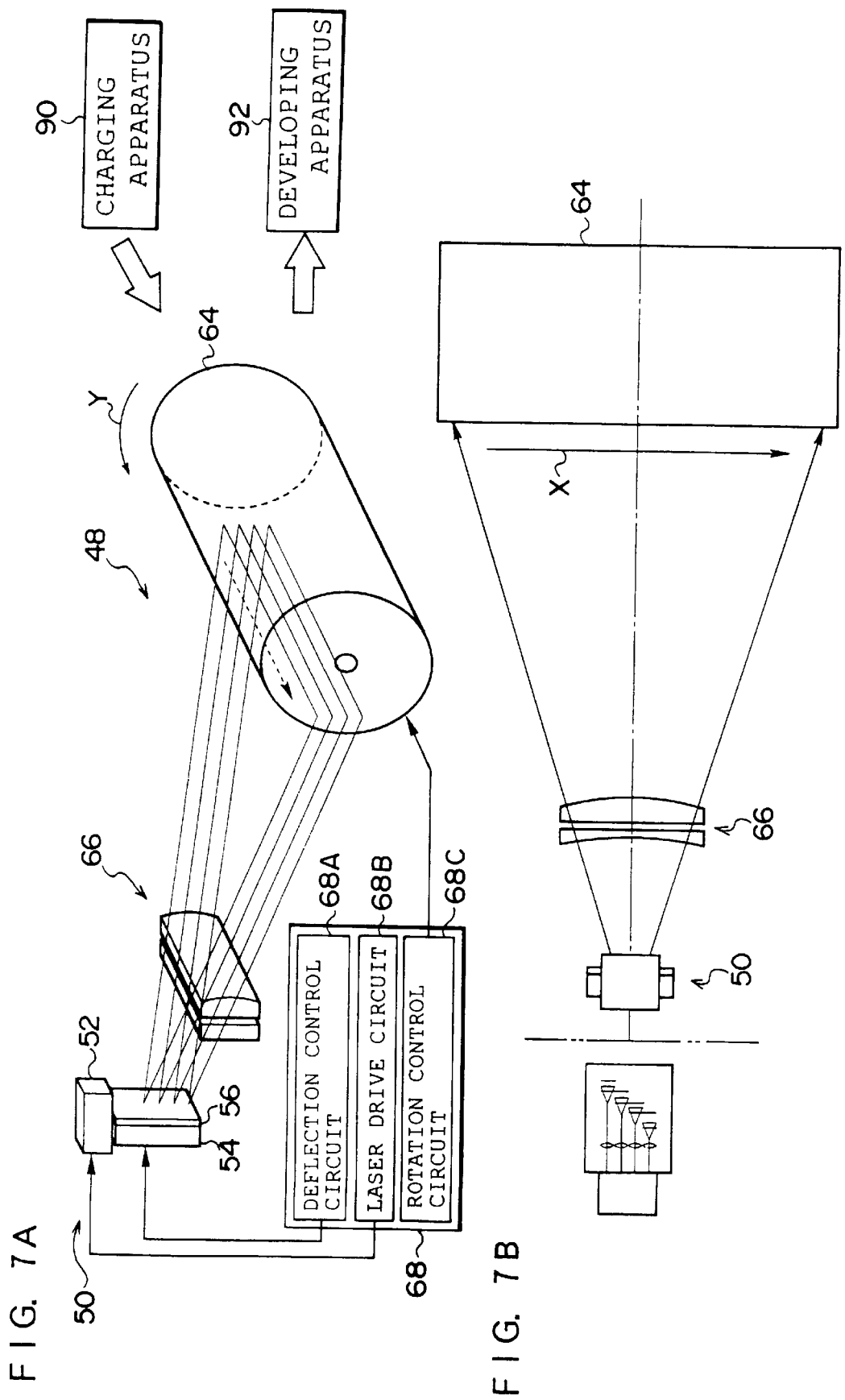

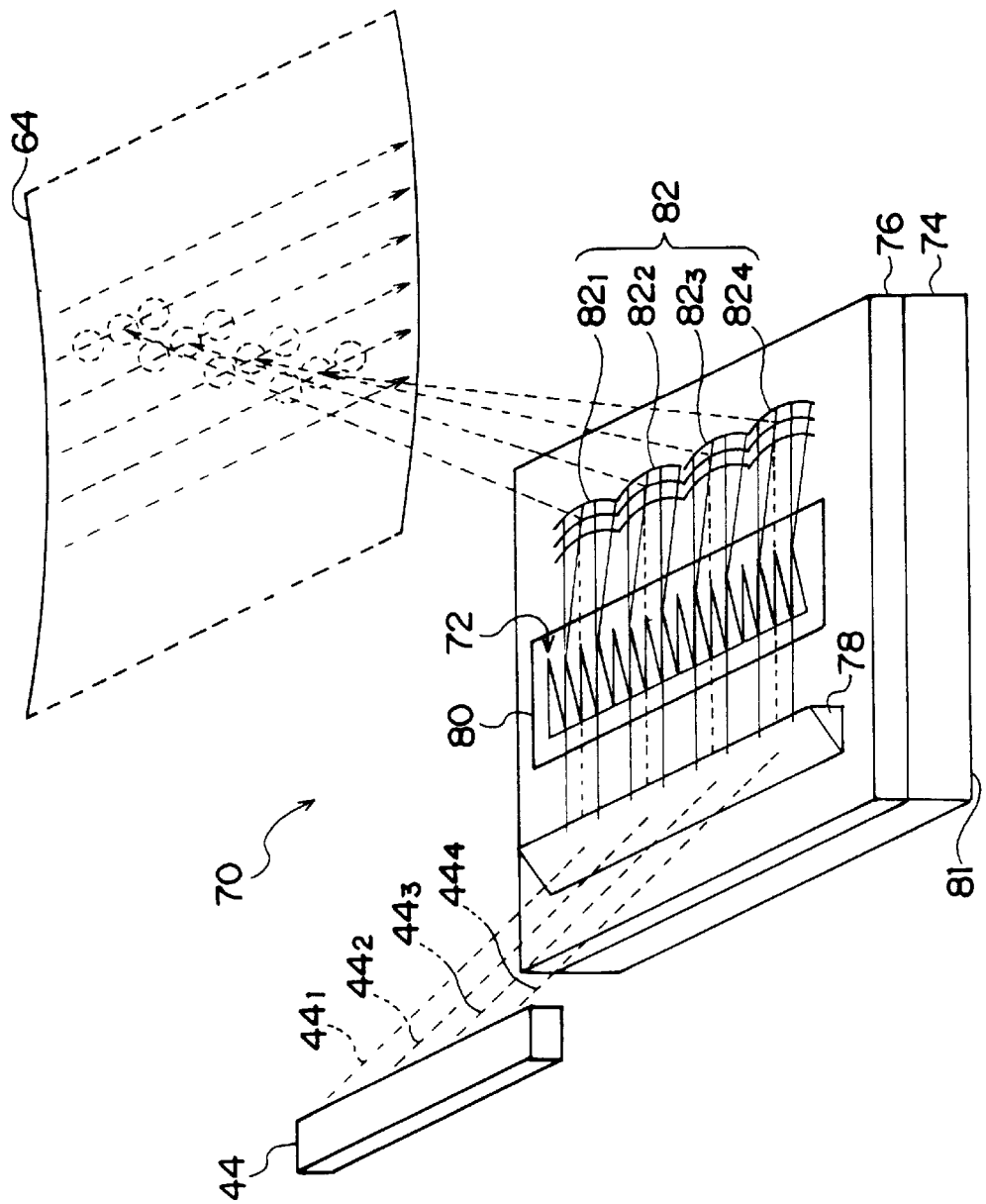

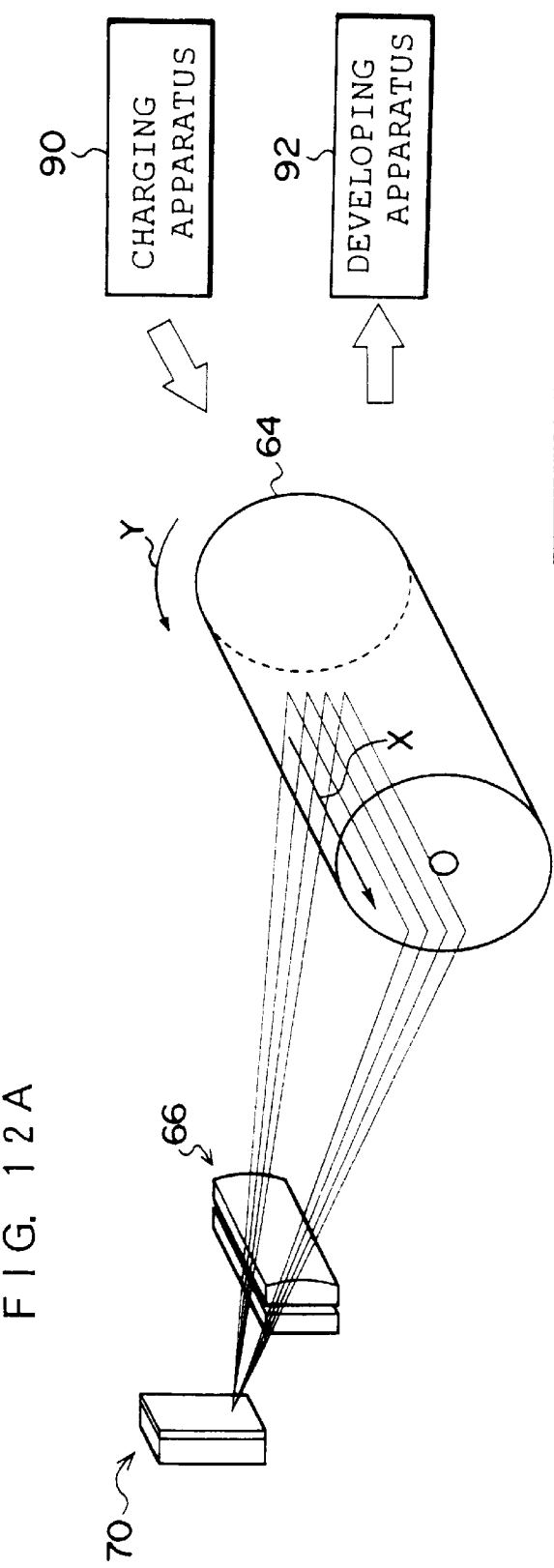
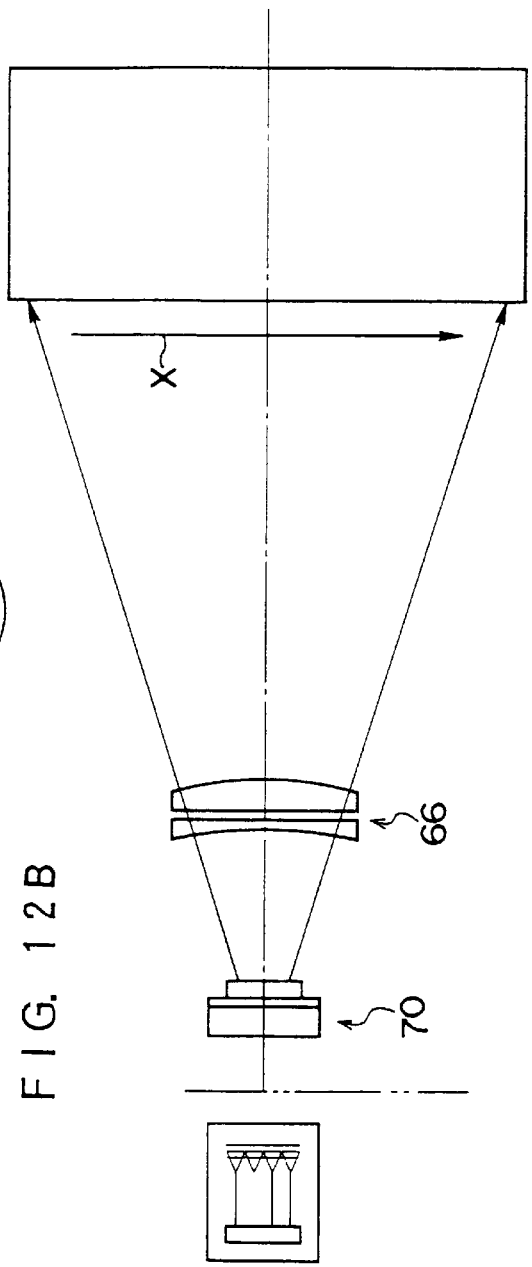
FIG. 12A
FIG. 12B

OPTICAL SCANNING DEVICE AND IMAGE FORMING APPARATUS

BACKGROUND OF THE INVENTION

1. Field of the Invention

The present invention relates to an optical scanning device and an image forming apparatus and, more particularly, to an optical scanning device, including a pickup for an optical disk or an optical device such as an optical switch for optical communication and an optical computer, for deflecting each light beam incident on an thin film optical waveguide by distributed refractive index of the optical waveguide, and an image forming apparatus such as a laser printer, a digital copying machine, or a facsimile using an optical scanning device.

2. Description of the Related Art

An optical scanning device, which is typically used in a laser beam printer, a digital copying machine, a facsimile, or the like, comprises a rotating polygon mirror for deflecting a light beam from a gas laser or a semiconductor laser and an fθ lens for focusing a light beam reflected from the rotating polygon mirror on an image forming surface such as a photosensitive member in the state of a uniform linear motion. In the optical scanning device using such a polygon mirror, since the polygon mirror is rotated at a high speed by a driving motor, durability is poor, and noise is generated in high-speed rotation. In consideration of the durability and noise, an optical scanning rate is disadvantageously restricted by the rotating speed of the driving motor.

For this reason, a light deflecting device serving as an optical waveguide type scanning device using an acousto-optic effect is proposed (C.S. Tsai, IEEE Trans. Circuits and Syst. vol. CAS-26 (1979) 1072., see Japanese Patent Application Laid-Open No. 52-68307, Japanese Patent Application Publication No. 63-64765, or the like). This optical waveguide type light deflecting device comprises an optical waveguide consisting of $LiNbO_3$, ZnO, or the like, an directing means for coupling (directing) a light beam into the optical waveguide, a comb-like electrode (transducer) for exciting a surface acoustic wave to deflect the light beam in the light waveguide by an acousto-optic effect, and an emission means for emitting the deflected optical beam from the optical waveguide. In order to effectively emit the optical beam, a thin-film lens or the like may be added to the light deflecting device as needed. An optical waveguide type light deflecting device having no mechanically mobile member such as a polygon mirror is advantageous because the light deflecting device is free from noise and has high reliability and a small size.

In an image forming apparatus with such light deflecting device, deflection of a light beam by the light deflecting device is defined as main scanning, and movement in a direction perpendicular to the main scanning direction on a projection surface of a photosensitive member or the like irradiated with the light beam is defined as sub-scanning. In this case, scan lines formed by the main scanning on the projection surface can form an image surface which continues in the sub-scanning direction. By changing the intensity of the light beam according to image data depending on the density of an image or the like synchronously with the scanning (main scanning and sub-scanning), the image can be formed. In recent years, it is demanded that an output such as a high-quality print is formed within a short period of time, i.e., an increase in scanning rate is demanded.

However, disadvantageously, an acousto-optic light deflecting device generally has a limited laser scanning rate with an upper limit value due to a deflection rate limit. More specifically, when high-speed scanning is performed by one light beam deflected by the acousto-optic light deflecting device, deflection is performed by an excited surface acoustic wave. For this reason, a deflection rate is limited to a specific value, and a scanning rate has an upper limit value. Therefore, application of the light deflecting device for an image forming apparatus such as a laser printer, a digital copying machine, or a facsimile is limited.

In order to solve the above problem, as another light deflecting device having no mechanical mobile member, a prism type light deflecting device using a material having an electro-optic effect whose modulation rate higher than that of the acousto-optic effect is known (see A. Yariv, Optical Electronics, 4th ed. (New York, Rinehart and Winston, 1991) pp. 336 to 339, Q, Chen, et al., J. Lightwave Tech. vol. 12 (1994) 1401, Japanese Patent Application Laid-Open No. 62-47627, or the like). While the acousto-optic light deflecting device deflects a light beam by an excited surface acoustic wave, the electro-optic light deflecting device applies a signal to an electrode arranged in an optical waveguide to periodically distribute the refractive index of the optical waveguide, and a light beam is deflected by the distributed refractive index. As such a prism type light deflecting device, a bulk device using a ceramic or a single-crystal materials is known. However, since the bulk device itself is large in dimension, and is driven by a high voltage, a practical deflection angle cannot be obtained in the bulk device. Furthermore, a prism type domain inversion light deflecting device or a prism type electrode light deflecting device using an $LiNbO_3$ single-crystal wafer in which a Ti-diffusion type optical waveguide or a proton-exchange type optical waveguide is formed is also known.

However, in order to obtain an electro-optic device, an electrode interval of about 5 mm which is equal to the thickness of the $LiNbO_3$ single-crystal wafer is required. For this reason, a driving voltage for this type device becomes high. In the above prior art, a deflection angle of only about 0.5° can be obtained at a drive voltage of ±600 V, and a practical deflection angle cannot be obtained.

In order to solve the above problem, the applicants has proposed an optical scanning device which has an optical waveguide, a light source for causing a light beam to be incident into the optical waveguide, and an electrode for deflecting the light beam in the optical waveguide by an electro-optic effect (Japanese Patent Application No. 7-176939).

Such an electro-optic optical scanning device does not have a problem associated with the scanning rate upper limit value because the electro-optic switching speed is high. However, a modulation rate of a driver for modulating the intensity of a light beam incident on the optical waveguide according to image data is limited to a specific value, and the scanning rate is limited to a specific value due to the limited modulation rate.

In order to solve the above problem, by scanning a plurality of light beams simultaneously or by scanning light beams determined selectively from a plurality of light beams, an modulation rate can be substantially increased.

However, in order to simultaneously scan a plurality of light beams, optical axes adjustment for positioning respective optical scanning devices corresponding to a plurality of light beams must be performed at a high accuracy to keep the scan-line interval of several tens microns so as to prevent ununiformity of the image surface. Optical axis adjustment for realizing the positional accuracy described above can be performed experimentally. However, since fine adjustment requires a long period of time and it must be performed in a complex structure, this method is not practical.

The present invention has been made in consideration of the above circumstances.

An object of the present invention is to obtain an optical scanning device which has a simple arrangement and can deflect a plurality of light beams while keeping a predetermined interval between a plurality of scan lines formed by the plurality of light beams is kept.

Another object of the present invention is to obtain an image forming apparatus using an optical scanning device.

SUMMARY OF THE INVENTION

An optical scanning device according to the present invention comprises an optical waveguide constituted by a thin film, a light source for causing a plurality of light beams to be incident onto the optical waveguide, a plurality of deflection means, respectively arranged for the plurality of light beams, for deflecting the light beams by using an electro-optic effect which distributes a refractive index of the optical waveguide depending on input signals to cause diffraction by the distributed refractive index, and a plurality of emission means, respectively arranged for the plurality of deflection means, for causing the deflected light beams to emit from the optical waveguide.

In each of the plurality of deflecting means of the optical scanning device according to the present invention, an incident light beam is deflected by the electro-optic effect. Since the emission means is arranged for each of the deflection means, the light beam deflected by each of the deflecting means is emitted from the optical waveguide by only a corresponding emission means. Therefore, a plurality of deflected light beams can be easily emitted from the optical scanning device without any complex adjustment.

The plurality of deflection means has a prism-shaped polarization domain inversion region formed in the optical waveguide with two sides being not parallel to each other and a plurality of electrodes for holding the optical waveguide therebetween, and applies voltage across the plurality of electrodes to generate different refractive indexes in the prism-shaped polarization domain inversion region and other regions, thereby distributing the refractive index; or the plurality of deflection means has a plurality of electrodes, having a prism-shaped pattern with two sides being not parallel to each other, for holding the optical waveguide therebetween, and applies voltage across the plurality of electrodes to generate regions corresponding to the electrode pattern and having different refractive indexes, thereby distributing the refractive index.

The light source is formed on a single substrate, and is a laser array for emitting a plurality of light beams. In this manner, a plurality of light beam can be easily incident onto the optical waveguide without complex adjustment of incident optical axes or the like at incidence.

In this case, as described in the prior art, an apparent modulation rate is substantially increased to prevent a scanning rate from being limited. For this reason, in order to simultaneously scan (deflect) a plurality of light beam or scan (deflect) light beams determined selectively from the plurality of light beams without ununiformity, different control operation must be performed for each light beam depending on scan lines formed by scanning performed by deflecting of the plurality of light beams.

The plurality of emission means may be arranged at positions spaced apart from an incident position by substantially the same distance in the propagation direction of the incident light beams, and emit the light beams at different emission angles. In this manner, light beams emitted from the optical scanning device have different directions, and the light beams are separated from each other depending on its directions at emission, so that the light beams can be easily used independently.

When a plurality of scan lines are formed in image formation or the like, and a plurality of light beams are simultaneously scanned by deflection or light beams determined selectively from the plurality of light beams is scanned by deflection, in order to obtain scanning equivalent to that obtained by scanning a single light beam a plurality of times, a plurality of light beams emitted from the optical scanning device must be emitted such that the light beams are uniformly distributed in the deviation direction of emission angles.

When the plurality of emission means are constituted by at least three emission means, the plurality of emission means are set such that differences between adjacent emission angles are substantially equal to each other when the emission angles are arranged in an ascending order. In this manner, the plurality of light beams emitted from the optical scanning device are emitted at equal angle interval, and the light beams can be emitted such that the light beams are uniformly distributed in the deviation direction of emission angles.

The plurality of emission means may be arranged at positions spaced apart from an incident position by different distances in the propagation direction of the incident light beams, and emit the light beams at almost the same emission angle. In this manner, the respective light beams are emitted at emission in almost the same direction, and the light beams are separated from each other depending on emission positions, and can be easily used independently.

When the plurality of emission means are constituted by at least three emission means, the positions spaced apart from the incident position by the different distances are set to be arranged at equal intervals in the propagation direction of the light beams. In this manner, the respective light beams are emitted at emission in almost the same direction, and the light beams are separated from each other depending on emission positions, and can be uniformly distributed in the emission direction.

The emission means are constituted by gratings or prisms, so that emission angles or emission positions can be easily set.

In an image forming apparatus which has a photosensitive member for forming an image, charging means for uniformly charging the photosensitive member, exposure means for irradiating light on the photosensitive member to form a latent image, and developing means for making the latent image visible, the exposure means comprises a thin-film optical waveguide, a light source for causing a plurality of light beams to be incident onto the optical waveguide, a plurality of deflection means, respectively arranged for the plurality of light beams, for deflecting the light beams by using an electro-optic effect which distributes a refractive index of the optical waveguide depending on input signals to generate diffraction by the distributed refractive index, and a plurality of emission means, respectively arranged for the plurality of deflection means, for causing the deflected light beams to emit from the optical waveguide. In this manner, without optical axis adjustment for positioning the optical scanning device at a high accuracy, the plurality of light beams can be simultaneously scanned or light beams determined selectively from the plurality of light beams can be scanned while a predetermined scan-line interval on an image surface is kept to prevent ununiformity.

As an optical waveguide material which can be applied to form an optical waveguide according to the present invention, an $ABO_3$ perovskite type oxide is known. In this $ABO_3$ perovskite type oxide, as a tetragonal crystal, an orthorhombic crystal, or a pseudo cubic crystal, for example, $BaTiO_3$, $PbTiO_3$, $Pb_{1-x}La_x(Zr_y Ti_{1-y})_{1-x/4} O_3$ (PZT, PLT, or PLZT depending on the values of x and Y), $Pb(Mg_{1/3} Nb_{2/3})O_3$, $KNbO_3$, and the like are known. As a hexagonal system, for example, a ferroelectric material represented by $LiNbO_3$, $LiTaO_3$, and the like are known. As a tungsten-bronze-type oxide, $Sr_xBa_{1-x}Nb_2O_6$, $Pb_xBa_{1-x}Nb_2O_6$, and the like are known. In addition to the above materials, $Bi_4Ti_3O_{12}$, $Pb_2KNb_5O_{15}$, $K_3Li_2Nb_5O_{15}$, and substitutive derivatives of these materials are known.

When $LiNbO_3$ is used as an optical waveguide material, after Ti is deposited on an $LiNbO_3$ single-crystal wafer, Ti is diffused into the $LiNbO_3$ wafer at 1,000° C., thereby manufacturing an optical waveguide. An optical waveguide can also be manufactured by proton exchange. That is, when an $LiNbO_3$ thin film is epitaxially grown in a vapor phase on an $LiTaO_3$ single-crystal substrate by RF-magnetron sputtering, an optical waveguide can be formed. In addition, when an $LiNbO_3$ thin film is epitaxially grown in a solid phase on an $\alpha$-$Al_2O_3$ single-crystal substrate by a sol-gel process, an optical waveguide can be formed.

When the PLZT is used as an optical waveguide material, a waveguide can be formed such that a PLZT thin film is epitaxially grown in a vapor phase on an MgO substrate by ion beam sputtering, an optical waveguide can be formed such that a PLZT thin film is epitaxially grown in a vapor phase on an epitaxial MgO buffer layer on a GaAs substrate by RF magnetron sputtering, or an optical waveguide can be formed such that a PLZT thin film is epitaxially grown in a solid phase on an $SrTiO_3$ substrate by a sol-gel process.

As the electrodes arranged on the plurality of deflecting means, various metal electrodes consisting of Pt, Al, or Cr or transparent oxide electrodes consisting of ITO or the like having a refractive index smaller than that of the optical waveguide can be used.

A cladding layer having a refractive index smaller than that of the optical waveguide can be formed between the optical waveguide and an electrode (upper or lower electrode). Eor example, the cladding layer is formed between the optical waveguide and the upper electrode, any appropriate material can be used as the material of the upper electrode. However, since a drive voltage is increased in this case, a transparent oxide electrode consisting of ITO is preferably used as the upper electrode. As the lower electrode, a conductive or semi-conductive single-crystal substrate, or a conductive or semi-conductive epitaxial or orientated thin film which is formed between the substrate and the optical waveguide can be used. When such a lower electrode is used, an oxide such as Nb-doped $SrTiO_3$, Al-doped ZnO, $In_2O_3$, $RuO_2$, $BaPbO_3$, $SrRuO_3$, $YBa_2Cu_3O_{7-x}$, $SrVO_3$, $LaNiO_3$, or $La_{0.5}Sr_{0.5}CoO_3$ having a refractive index smaller than that of the optical waveguide is preferably used, or a metal such as Pd, Pt, Al, Au, or Ag is advantageously used. The conductive or semi-conductive single-crystal substrates or the conductive or semi-conductive epitaxial or orientated thin film is preferably selected depending on the crystal structure of the ferroelectric thin film. Although the resistivity of the conductive or semi-conductive thin film or the single-crystal substrate used as the upper or lower electrode is effective within the range of $10^{-6}$ Ω cm to $10^3$ Ω cm, a conductive or semi-conductive thin film or single-crystal substrate having a resistivity at which voltage drop can be neglected can be used as the upper or lower electrode. An upper electrode material or a lower electrode material having appropriate carrier mobility can be selected depending on a deflection rate or a modulation rate.

As a light source available in the present invention is applied, a laser apparatus for emitting a laser beam is used. As this laser apparatus, a gas laser using He—Ne or the like, a compound semiconductor laser using AlGaAs or the like, a laser array in which these semiconductor lasers are arranged is available. A laser beam generated by laser oscillation can be guided to an optical waveguide by a method selected from a prism coupling method, a butt coupling (end coupling) method, a grating coupling method, and an evanescent field coupling method. As a thin-film lens, a mode index lens, a Luneberg lens, a geodesic lens, a Fresnel lens, or a grating lens is properly used. As an emission means, a prism coupler, a grating coupler, a focusing coupler, or an SAW grating coupler is preferably used.

BRIEF DESCRIPTION OF THE DRAWINGS

FIGS. 7A and 7B are schematic views showing the arrangement of an image forming apparatus using the optical scanning device according to the first embodiment;

FIG. 11 is a schematic view showing an optical scanning device according to the third embodiment; and FIGS. 12A and 12B are a schematic views showing an image forming apparatus using the optical scanning according to the third embodiment.

DETAILED DESCRIPTION OF THE PREFERRED EMBODIMENTS

Embodiments of the present invention will be described below with reference to the accompanying drawings.

An electro-optic effect in an optical waveguide according to this embodiment will be described. In general, when an electric field is applied to a material having an electro-optic effect, a change in refractive index of a material by the electric field in a crystal structure having no symmetry center can be expressed by equation (1):

$$\Delta n = n - n_0 = -aE - bE^2 - \ldots \quad (1)$$

The first order term of equation (1) is called a Pockels effect and expressed by equation (2):

$$\Delta n = -(\tfrac{1}{2}) r n_0^3 E \quad (2)$$

The second order term of equation (1) is called a Kerr effect and expressed by equation (3):

$$\Delta n = -(\tfrac{1}{2}) R n_0^3 E^2 \quad (3)$$

In fact, as an electric field is increased, a change in refractive index occurs such that the Kerr effect is superimposed on the Pockels effect. When such the electro-optic effect is used, a ferroelectric material having a crystal structure having no symmetry center is used, $LiNbO_3$ or PLZT is typically used as described above. A local electric field is applied to a ferroelectric material such as a PLZT thin film, the refractive index of the portion to which the electric field is applied decreases as described above. When this phenomenon is used, a laser beam can be deflected or switched. In this EO (electro-optic effect) modulation, since deflection occurs without being limited by a movement time of phonons as in an optical scanning device using an acousto-optic effect, a spot movement time (switching time) is very short, i.e., picosecond order.

Figure 1:
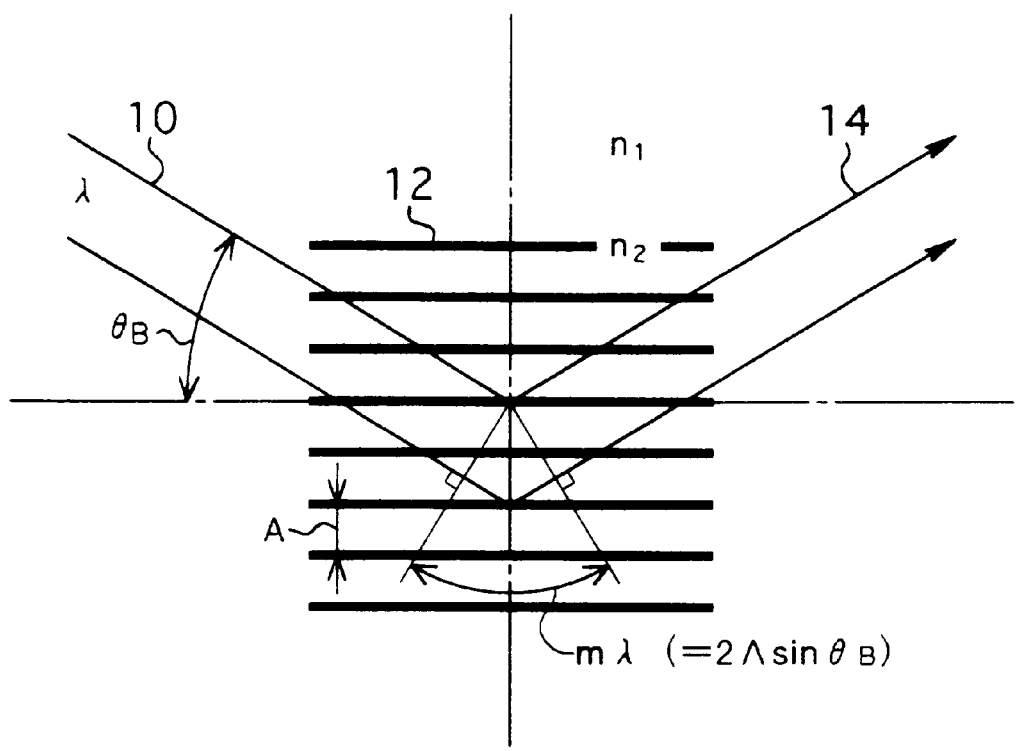
FIG. 1 is a view for explaining a Bragg diffraction obtained by an electro-optic effect.

When a predetermined electric field is applied to a transducer, as shown in FIG. 1, the refractive index of a thin film (optical waveguide) changes such that a portion 12 having a refractive index n2 different from a refractive index n1 obtained when the electric field is not applied is periodically (period indicated by an interval A in FIG. 1) formed. When the refractive index is periodically distributed as described above, an incident laser beam 10 is Bragg-diffracted under the condition expressed by equation (4). In this manner, the incident laser beam 10 becomes a Bragg-diffracted beam, i.e., a deflected laser beam 14.

$$m\lambda = 2\Lambda \sin\theta_B \quad (4)$$

where m: order of diffraction

λ: wavelength of laser beam

Λ: period of distributed refractive index $\theta_B$: Bragg angle

In this case, since the Bragg angle is a small angle, in order to deflect (scan) the laser beam in a wide range, a large number of electrodes must be arranged, and addressing must be performed to change the period of the change in refractive index depending on a deflection angle.

Figure 2:
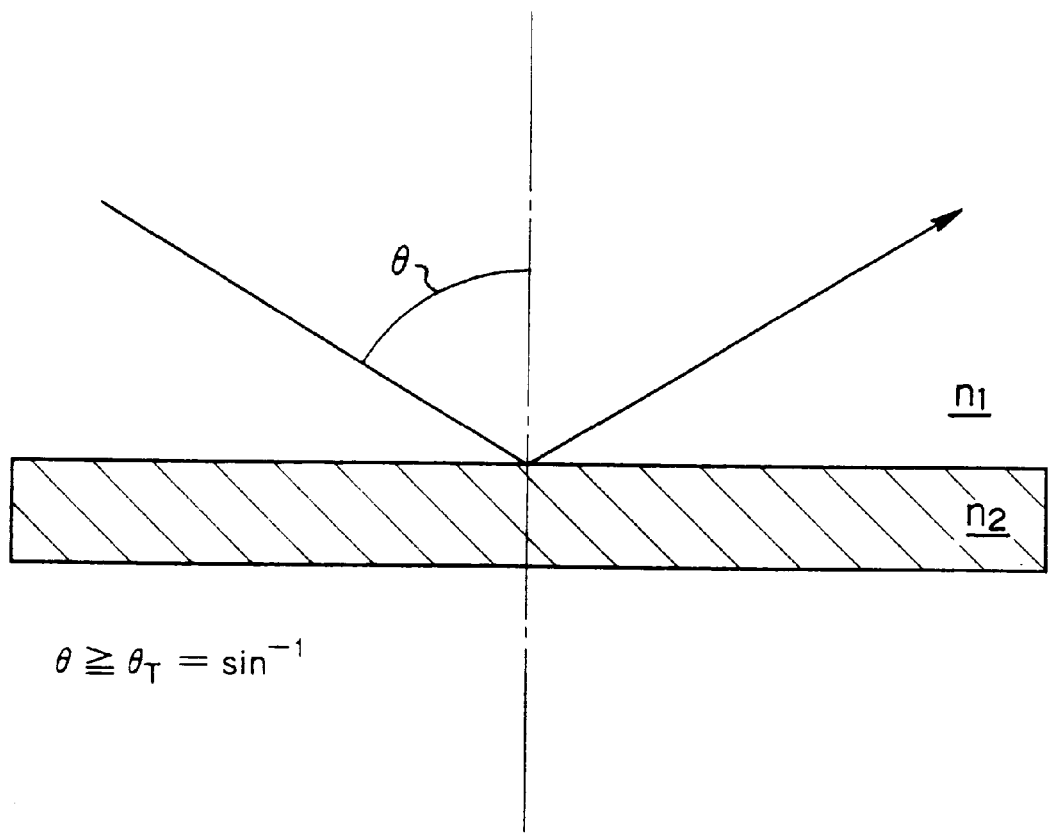
FIG. 2 is a view for explaining total reflection obtained by an electro-optic effect.

On the other hand, as shown in FIG. 2, a total reflection condition expressed by equation (5) must be satisfied to totally reflect an incident beam from the boundary between media having different refractive indexes (media having refractive index $n_1$ and refractive index $n_2$ shown in FIG. 2).

$$\theta \geq \theta_T = \sin^{-1}(n_2/n_1) \quad (5)$$

where θ: incident angle $\theta_T$: critical angle $n_1$: refractive index of optical waveguide material $n_2$: refractive index of portion where refractive index decreases $n_2 < n_1$ In this case, when a decrease in refractive index is caused by the Pockels effect, $\Delta n = -(\tfrac{1}{2}) r n_0^3 E$ is established. For this reason, equation (5) can be expressed by equation (6):

$$\begin{aligned}\theta_T &= \sin^{-1}(n_2/n_1) \\ &= \sin^{-1}\{(n_1+\Delta n)/n_1\} \\ &= \sin^{-1}(1-(1/2)rn_0^2 E)\end{aligned} \quad (6)$$

Since the Pockels coefficient of $LiNbO_3$ having a refractive index $n_0 = 2.286$ (633 nm) is about $r_{33} = 30.8 \times 10^{-12}$ m/V, when an electric field having 100 kV/cm is applied, a change in refractive index of $2 \times 10^{-3}$ is obtained. A maximum change θmax in laser beam in a propagation direction can be obtained at a critical angle $\theta_T$, and the following equation is established:

$$\begin{aligned}\theta\max &= (90 - \theta_T) \times 2 \\ &= \{90 - \sin^{-1}(n_2/n_1)\} \times 2 \\ &= (90° - 87.60°) \times 2 \\ &= 2.40° \times 2 \\ &= 4.80°\end{aligned}$$

In this case, in order to deflect (scan) the laser beam, for the same reason as described above, a large number of electrodes must be arranged, and addressing must be performed to change a reflective surface depending on a deflection angle.

As another device having an electro-optic effect, a prism type optical deflection device is known. This prism type optical deflection device will be described in FIG. 3 by using a media 20 obtained by connecting the oblique lines of two prisms 22 and 24 having different refractive indexes and the same shape whose length and height are represented by 1 and D. An optical path $L_A$ incident on the media 20 passes through the prism 22 having a refractive index $n_a$. The passage time $\tau_a$ can be expressed by equation (7) where $c_a$ is a light velocity in the prism 22, and the passage time $\tau_a$ can be expressed by equation (8) where c is a light velocity in a vacuum state. Similarly, a passage time $\tau_b$ of an optical path $L_B$ passing through the prism 24 having a refractive index nb can be expressed by equation (9):

$$\tau_a = 1/c_a \quad (7)$$

$$\tau_a = 1/c_a = (1/c)\cdot n_a \quad (8)$$

$$\tau_b = 1/c_b = (1/c)\cdot n_b \quad (9)$$

Therefore, when $n_a = n_b + \Delta n > n_b$ is established, a difference Δτ between the passage times of the optical paths $L_A$ and $L_B$ can be expressed by equation (10):

$$\Delta\tau = (1/c)\cdot(n_a - n_b) = (1/c)\cdot\Delta n \quad (10)$$

By the difference Δτ between the passage times, a difference Δy between the positions of wave surfaces before emission can be expressed by equation (11):

$$\Delta y = C_b \cdot \Delta\tau = c/n_b \cdot 1/c \cdot \Delta n = 1\Delta n/n_b \quad (11)$$

This result is equivalent to the refraction of a beam axis in the prism, and the angle can be expressed by equation (12):

$$\theta_D \approx \tan(\theta_D) = \Delta y/D = 1\Delta n/n_b \quad (12)$$

In addition, the angle of a laser beam emitted from the prism according to Snell's law can be expressed by equation (13):

$$n_{air} \cdot \sin\theta_0 = \sin\theta_0 = n_a \cdot \sin\theta_D \quad (13)$$

and an angle $\theta_0$ can be expressed by the following equation:

$$\theta_0 = \sin^{-1}(n_a \cdot \sin\theta_D) \simeq n_a \cdot \theta_D$$
$$= n_a \cdot 1\Delta n/Dn_b = 1\Delta n/D \cdot (n_a/n_b) \simeq 1\Delta n/D$$

Assume that the two prisms have polarization axes having opposite directions, and that an electric field is applied parallel to a z axis. In this case, according to equation (2), the refractive indexes $n_a$ and $n_b$ are expressed by equations (14) and (15), and the difference $\Delta n$ ($=n_a-n_b$) between these refractive indexes can be expressed by equation (16):

$$n_a = n_0 + (\tfrac{1}{2}) r n_0^3 E \quad (14)$$

$$n_b = n_0 - (\tfrac{1}{2}) r n_0^3 E \quad (15)$$

$$\Delta n = r n_0^3 E \quad (16)$$

Therefore, when the applied voltage and the thickness of the prism are represented by V and d, respectively, the angle $\theta_0$ can be expressed by equation (17). For this reason, the laser beam can be deflected in proportion to the electric field or the voltage.

$$\theta_0 = 1\Delta n/D = 1/D \cdot r n_0^3 E \quad (17)$$
$$= 1/D \cdot r n_0^3 (V/d)$$

Figure 3:
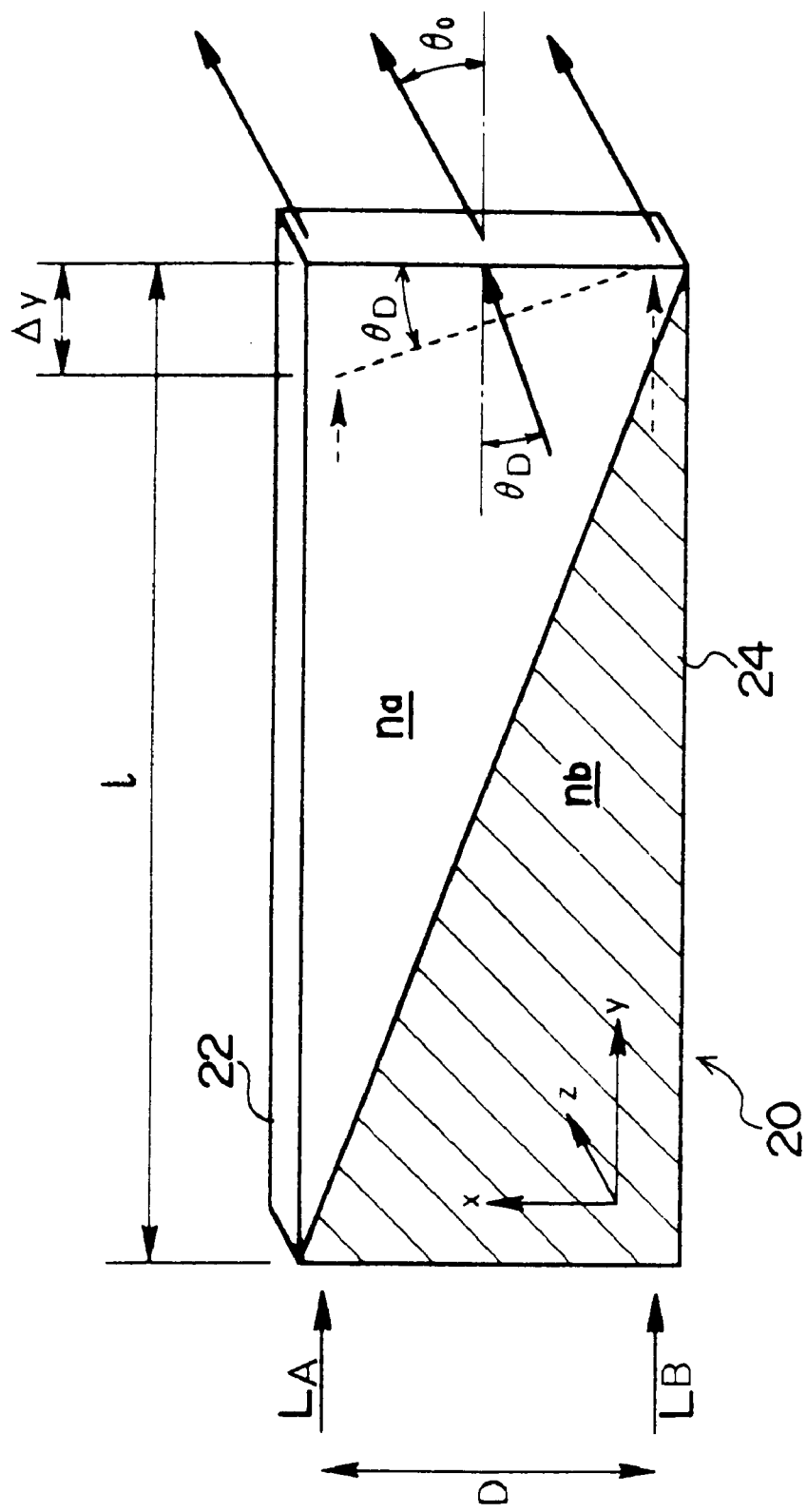
FIG. 3 is a conceptual view showing the arrangement of a prism type deflecting device.

Assume that triangle planar electrode is arranged at the position of the prism 24 in FIG. 3 in place of the two prisms, and that an electric field is applied parallel to the z axis. In this case, the refractive indexes $n_a$ and $n_b$ can be expressed by equations (18) and (19), and the difference $\Delta n$ ($=n_a-n_b$) can be expressed by equation (20):

$$n_a = n_0 \quad (18)$$

$$n_b = n_0(\tfrac{1}{2}) r n_0^3 E \quad (19)$$

$$\Delta n = \tfrac{1}{2} r n_0^3 E \quad (20)$$

Therefore, when an applied voltage and the thickness of the medium are represented by V and d, respectively, the angle $\theta_0$ can be expressed by equation (21)

$$\theta_0 = 1\Delta n/D = 1/D \cdot 1/2 r n_0^3 E \quad (21)$$
$$= 1/2D \cdot r n_0^3 (V/d)$$

Figure 4:
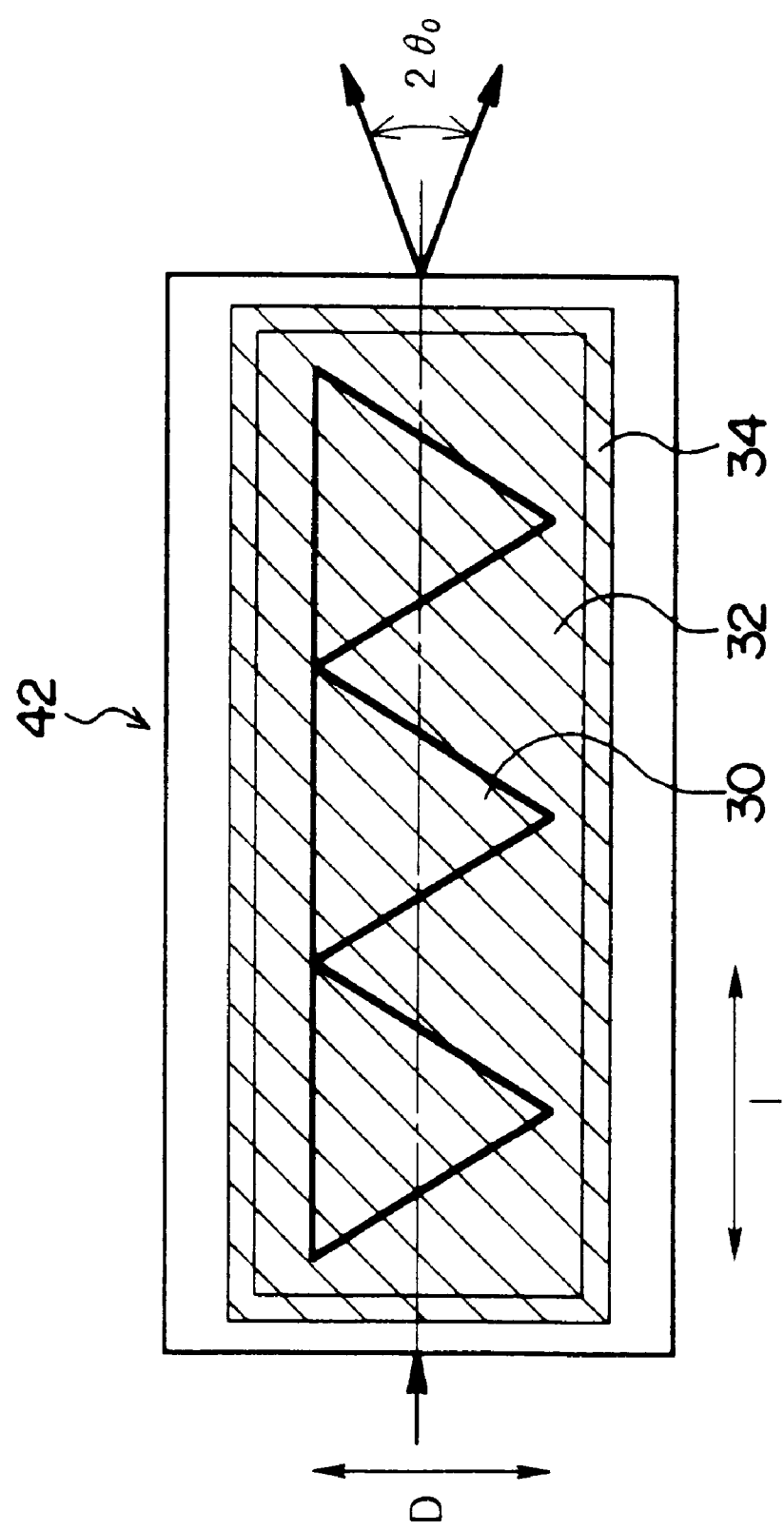
FIG. 4 is an upper view showing an optical waveguide type prism scanning device.
Figure 5:
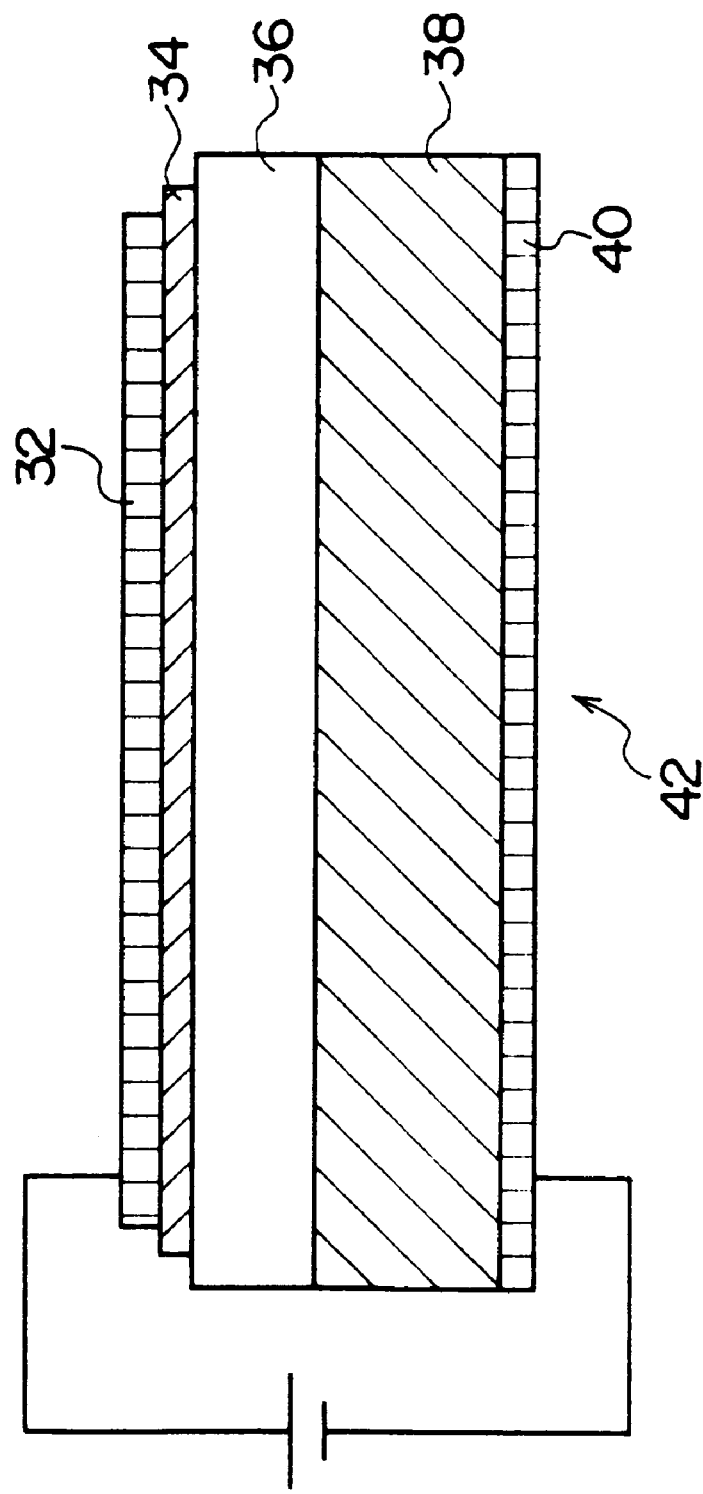
FIG. 5 is a sectional view showing an optical waveguide type prism scanning device.

As such an device, an optical scanning device 42 constituted by a Ti-diffusion type single-crystal LiNbO$_3$ optical waveguide or a proton exchange type single-crystal LiNbO$_3$ optical waveguide as shown in FIGS. 4 and 5 is developed. In this optical scanning device 42, an optical waveguide 36 having a polarization domain inversion portion (prism portion) 30 is formed on an insulating substrate 38, and a lower electrode 40 is formed below the insulating substrate 38. A cladding layer 34 and an cladding layer 34 are sequentially formed on the optical waveguide 36.

When such prism-type electro-optic deflection is used, a large number of electrodes are not necessarily used. In addition, since an electro-optic switching speed is very high, a laser scanning rate is 30 μs/line or more, i.e., exposure of 1,200 dot/inch on A4 paper can be performed at 180 sheet/min, and the upper limit of a scanning rate does not pose a problem. Since the limit of a modulation rate of a laser driver for an image forming apparatus is generally 300 Mbps, exposure of 1,200 dot/inch on A4 paper at 20 sheet/min is upper limit, and the laser recording rate cannot exceed this limit.

However, as will be described below, in this embodiment, a plurality of laser beams can be simultaneously scanned to expose a photosensitive material. For this reason, an scanning rate can be substantially increased by the factor of m (m=the number of beams), and the modulation rate of the laser driver becomes m×300 Mbps, so that the laser recording rate can be increased.

An optical scanning device of the present invention can comprises a light source constituted by a plurality of laser devices for causing a plurality of laser beams to be incident into an optical waveguide or a laser array for oscillating a plurality of laser beams. The optical scanning device also comprises electrodes for applying a voltage to generate a region having different refractive indexes so as to deflect the laser beams depending on the voltage, and comprises a plurality of gratings or prisms for emitting the deflected laser beams out of the optical waveguide. Note that laser beam shaping means such as collimating means as needed may be arranged in the optical waveguide.

When the deflected laser beams are to be emitted out of the optical waveguide, the following arrangement are preferably used. That is, a plurality of gratings or the like are arranged at the same position of the optical waveguide with respect to the propagation directions of the incident laser beams such that the laser beams have different emission angles, so that a plurality of lines on a photosensitive material can be simultaneously scanned or jump-scanned; or a plurality of gratings are arranged at different positions with respect to the propagation directions of the laser beams to obtain the same emission angle, so that a plurality of photosensitive material can be simultaneously scanned or jump-scanned. In order to form the gratings or the like for obtaining different emission angles, when gratings are used, the respective materials are changed, or the width of each grating is adjusted. When prisms are used, respective materials and shape or the like are changed to make it possible to obtain different emission angles. It is preferable in consideration of the positional accuracy of the emitted laser beams that the plurality of gratings or prisms have the same structure and are different in only arrangement position.

In image formation, a laser beam emitted from the optical waveguide exposes the photosensitive material through an optical system such as an f. θ lens, and scanning is performed in the following manner. That is, simultaneous scanning or jump scanning is performed for a plurality of lines on a photosensitive material which are formed such that deflection and rotation or the like of a photosensitive drum are defined as a main scanning direction and a sub-scanning direction, respectively.

[First Embodiment]

The first embodiment of the present invention will be described below with reference to the above principle.

As shown in FIG. 7A, an image forming apparatus 48 according to this embodiment comprises an optical scanning device 50 having a semiconductor laser 52, a substrate 54, and an optical waveguide 56 as main components. Four laser beams deflected at a predetermined angle are emitted from the optical scanning device 50 (details will be described later). On the emission side of the laser beams from the optical scanning device 50, a focusing optical system 66 including an fθ lens and a photosensitive member 64 are sequentially arranged. The image forming apparatus 48 comprises a control unit 68 constituted by a deflection control circuit 68A, a laser drive circuit 68B, and a rotation control circuit 68C.

The deflection control circuit 68A of the control unit 68 is a circuit for applying a voltage to deflect the laser beams by an electro-optic effect. With the application of the voltage from the deflection control circuit 68A, the laser beams are scanned in a predetermined direction (direction indicated by an arrow X in FIG. 7B, i.e., main scanning direction) on the photosensitive member 64. The laser drive circuit 68B is a circuit for controlling the intensity and emission time (exposure time) of the laser beams emitted from a semiconductor laser 52. The rotation control circuit 68C is a circuit for rotating or step-driving the photosensitive member 64 at a predetermined speed in a predetermined direction (direction indicated by an arrow Y in FIG. 7A, i.e., subscanning direction).

The deflection control circuit 68B performs pulse width modulation or amplitude modulation to the semiconductor laser 52 on the basis of image data supplied from a host computer or the like (not shown). This image data is data corresponding to an image formed on the photosensitive member 64. In this case, laser beams emitted by driving by the laser drive circuit 68B are synchronized with the deflection control circuit 68A and the rotation control circuit 68C, the deflection angle of a light beam deflected by the deflection control circuit 68A corresponds to a position in a main scanning direction during image formation, and the position of the photosensitive member 64 rotated by the rotation control circuit 68C corresponds to a position in a subscanning direction during image formation. The main scanning and sub-scanning can form a two-dimensional image on the photosensitive member 64.

The image forming apparatus 48 according to this embodiment comprises a charging apparatus 90 for uniformly charging the photosensitive member 64 and a developing apparatus 92 for developing a latent image formed on the photosensitive member 64. The charging apparatus 90 and the developing apparatus 92 makes the image visible. More specifically, the photosensitive member 64 is uniformly charged by the charging apparatus 90, and a latent image is formed at an exposure position of the photosensitive member 64 by laser beam exposure. In this manner, the latent image formed on the photosensitive member 64 is developed on a duplication material such as paper or a film by the developing apparatus 92.

Figure 6:
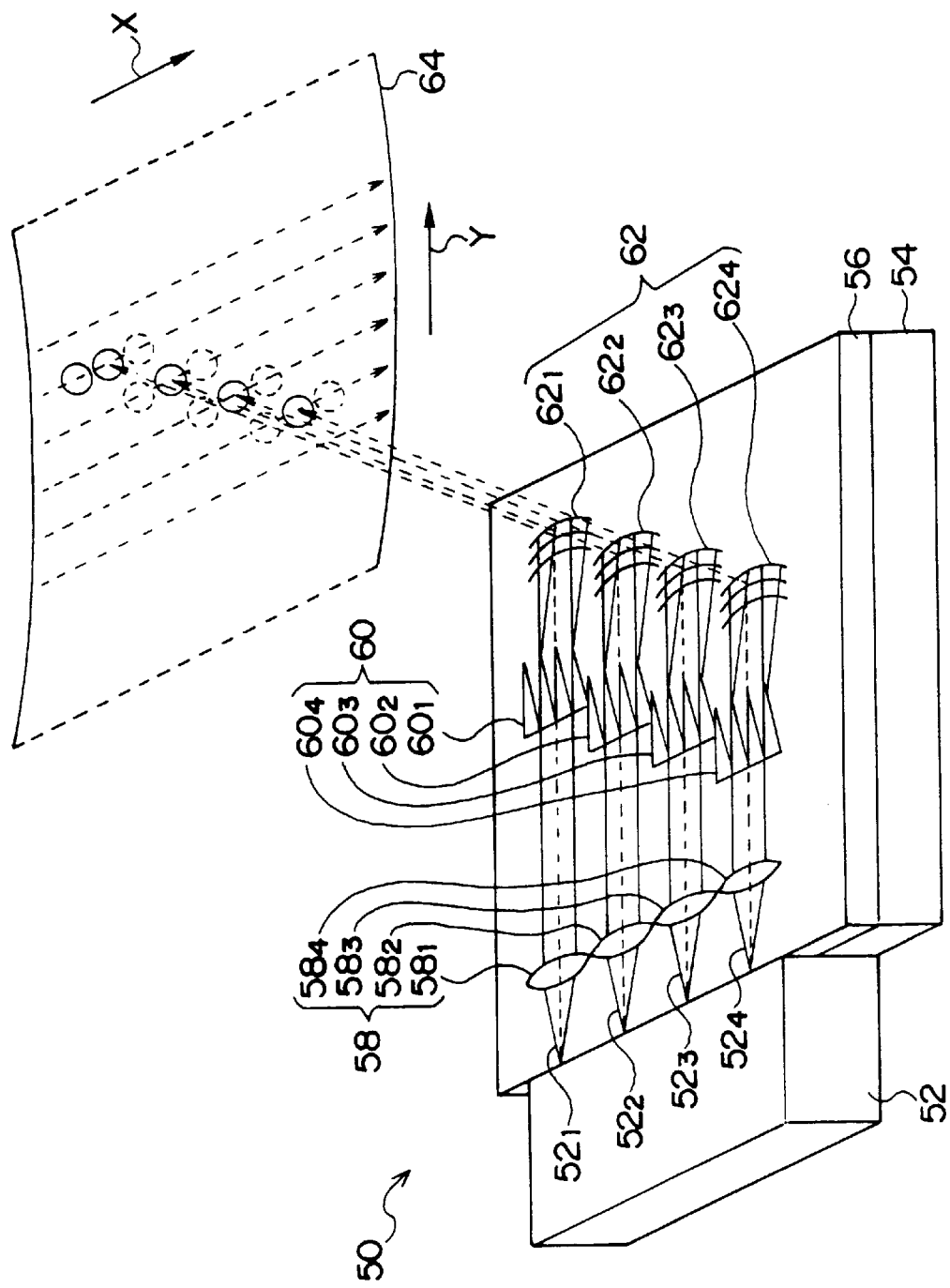
FIG. 6 is a conceptual view showing an optical scanning device using a four-spot semiconductor laser according to the first embodiment.

As show in FIG. 6, the optical scanning device 50 according to this embodiment comprises a four-spot type semiconductor laser 52 for emitting four laser beams $52_1$, $52_2$, $52_3$, and $52_4$. On the emission side of the semiconductor laser 52, a single-crystal conductive substrate 54 in which the thin-film optical waveguide 56 is formed is arranged.

On the laser beam incident side of the thin-film optical waveguide 56, mode index lenses $58_1$–$58_4$ for collimating incident laser beams $52_1$–$52_4$ (to width D=16 mm) are arranged for the laser beams $52_1$–$52_4$, respectively. On the thin-film optical waveguide 56, four prism type electrode arrays $60_1$–$60_4$ are arranged by different distances from the incident positions of the laser beams $52_1$–$52_4$, in a propagation direction of the laser beams, respectively. On the downstream side of the optical waveguide 56 in the propagation direction of the laser beams, gratings $62_1$–$62_4$ for emitting the laser beams out of the optical waveguide 56 are arranged for the laser beams $52_1$–$52_4$, respectively.

The gratings $62_1$–$62_4$ are formed to emit the laser beams at the same emission angle out of the thin-film optical waveguide 56, and are arranged at predetermined intervals in the propagation direction of the laser beams.

The optical scanning device 50 is manufactured in the following manner. The epitaxial PLZT (12/40/60) thin-film optical waveguide 56 is grown on the Nb-doped $SrTiO_3$ (100) single-crystal conductive substrate 54 having predetermined lateral/vertical lengths and a resistivity of about 5 mΩcm –500 mΩcm. In the thin-film optical waveguide 56, a PLZT layer having a thickness of 600 nm is formed by solid-phase epitaxial growing using a sol-gel process in the following manner. That is, lead acetate anhydride $Pb(CH_3COO)_2$, lanthanum isopropoxide $La(O-iso-C_3H_7)_3$, zirconium isopropoxide $Zr(O-iso-C_3H_7)_4$, and titanium isopropoxide $Ti(O-iso-C_3H_7)_4$ are used as start materials and dissolved in 2-methoxyethanol. After distillation is performed for 6 hours, reflux is performed for 18 hours. Finally, a precursor solution for PLZT (12/40/60) having a Pb concentration of 0.6 M is obtained. In addition, this precursor solution is spin-coated on the substrate. All the above operations are performed in an $N_2$ ambient atmosphere. The temperature is increased at 10° C./sec in a humidified $O_2$ ambient atmosphere, the temperature is kept at 350° C., and then kept at 650° C. Finally, a power supply of an electric furnace is turned off to perform a cooling operation. In this manner, the first PZT thin film having a thickness of about 100 nm is epitaxially grown in a solid phase. In addition, the above operations are repeated a predetermined times (5 times in this embodiment) to obtain an epitaxial PLZT thin film having a total thickness of 600 nm. In crystallographical relationship, a structure having PLZT (100)//Nb-$SrTiO_3$ (100) and in-plane orientation PLZT [001]//Nb-$SrTiO_3$ [001] can be obtained.

On the PLZT thin-film optical waveguide 56, four prism type electrode arrays 60 constituted by an ITO transparent conductive oxide thin film having a resistivity of about 1 mΩcm and a thickness of about 100 nm are formed. As a light source, the semiconductor laser 52 serving as a four-spot laser diode array having beams each having a wavelength of 780 nm and a 20-mW output is directly fixed to the end face of the thin-film optical waveguide 56 to perform butt coupling.

The gratings 62 for emitting the deflected light beams out of the optical waveguide are arranged at predetermined intervals in the propagation direction of the beams, and are constituted by diffraction grating formed by ion milling and having almost the same emission angle.

An operation of the image forming apparatus according to this embodiment will be described below.

In the optical scanning device 50, four laser beams are emitted from the semiconductor laser 52, and are incident on the thin-film optical waveguide 56. Since the thin-film optical waveguide 56 has a refractive index larger than those of an ITO transparent conductive oxide thin film and an Nb-doped $SrTiO_3$ (100) single-crystal conductive substrate, the laser beams emitted from the semiconductor laser 52 are confined in the PLZT thin-film optical waveguide 56. The laser beams incident on the thin-film optical waveguide 56 are collimated by the mode index lenses 58, respectively, and reach the grating 62. The laser beams are emitted out of the thin-film optical waveguide 56. In this case, the single-crystal conductive substrate 54 functions as a lower electrode. When a voltage is applied across the substrate 54 and the ITO thin-film triangle electrode array 60 arranged on the thin-film optical waveguide 56, as described above, the refractive index of thin-film optical waveguide 56 changes due to a periodical Kerr effect, and the propagating laser beams are deflected. On the downstream side of the thin-film optical waveguide 56 in the propagation direction of the laser beams, the gratings $62_1$–$62_4$ for emitting the laser beams out of the thin-film optical waveguide 56 are arranged for the laser beams $52_1$–$52_4$, respectively. By using the gratings 62 arranged at predetermined intervals, the deflected laser beams are emitted at almost the same emission angle out of the thin-film optical waveguide 56 from different positions, i.e., positions set at predetermined intervals in the propagation direction of the laser beams.

The laser beams deflected as described above are emitted by the gratings 62, and reach the photosensitive member 64 through the focusing optical system 66 such as an fθ lens to expose the photosensitive member 64. The deflection in the optical scanning device 50 is defined as main scanning (scanning in a direction indicated by an arrow X in FIG. 7). In this case, the same deflection is simultaneously performed for the laser beams, and sub-scanning (scanning in a direction indicated by an arrow Y in FIG. 7) by rotation of the photosensitive member 64 is performed. In this manner, scanning for the four lines on the photosensitive member 64 is simultaneously performed.

Note that the photosensitive member 64 is uniformly charged by the charging apparatus 90 in advance, and a latent image is formed on the photosensitive member 64 by simultaneous scanning. The latent image formed on the photosensitive member 64 subjected to the simultaneous scanning is made visible on a duplication material such as paper or a film by the developing apparatus 92.

The deflected Laser beams reached the gratings 62 have almost the same emission angle, and are emitted from different positions arranged at predetermined intervals in the propagation direction of the laser beams. Therefore, the laser beams emitted from the optical scanning device 50 become four almost parallel laser beams having the same direction (FIG. 6). Since these laser beams may be simultaneously subjected to deflection (main scanning), four laser beams having the same direction and kept parallel are emitted from the optical scanning device 50. Therefore, a complex adjusting apparatus in which a plurality of laser beams are simultaneously scanned and the scan-line interval of several tens microns is kept with respect to the image surface of the photosensitive member 64 to prevent ununiformity is not required, and fine adjustment of optical axes need not be performed. For this reason, by only focusing the laser beams on the photosensitive member 64 through the focusing optical system 66, scanning can be performed while keeping a predetermined scan-line interval.

As the performance of the optical scanning device 50 according to this embodiment, when the modulation rate of a laser drive is set to 300 Mbps, an substantial modulation rate is 1,200 Mbps because of simultaneously scan of four lines. The applicants performed an experiment that a photosensitive member is exposed under the above condition. In this experiment, printing of 1,200 dot/inch on A4 paper was performed at 80 sheet/min. As a result, a practical printing rate could be realized.

Due to loss caused by coupling of a laser beam to the optical waveguide, loss caused by scattering or the like of a laser bean in the optical waveguide, loss of a laser beam from the optical waveguide in an output operation, and the like, a laser exposure energy density on the photosensitive member decreases. However, according to this embodiment, since the semiconductor laser emitting four laser beams is used, even if loss of the laser beams occurs, a laser exposure energy density which is four times larger than the case of single-beam laser can be obtained. For this reason, required laser exposure energy density on the photosensitive member can be sufficiently obtained. In addition, since the gratings for emitting deflected laser beams out of the optical waveguide emits the laser beams at the same emission angle, the positional accuracy among emitted laser beams can be improved.

The applicants examined, as a comparative embodiment, an optical scanning device arranged on an image forming apparatus, wherein a single spot laser diode having an output of 20 mW were directly fixed to the end face of a single PLZT thin-film optical waveguide to perform coupling. An incident laser beam having a beam width D=16 mm was deflected in the same manner as that in this embodiment. After deflection, the deflected light beam was emitted by a grating for emitting a light beam out of the optical waveguide, and scanned and exposed onto a photosensitive member. As the performance of the optical scanning device of this comparative embodiment, printing of 1,200 dot/inch A4 paper at 20 sheet/min was an upper limit because the modulation rate of a laser drive was 300 Mbps. Due to loss caused by coupling of a laser beam to the optical waveguide, loss caused by scattering or the like of a laser bean in the optical waveguide, loss of a laser beam from the optical waveguide in emission (output operation), and the like, a total of about 50% loss of the laser beam occurred, a sufficient laser exposure energy density on the photosensitive member required for exposure was not obtained.

Figure 8A:
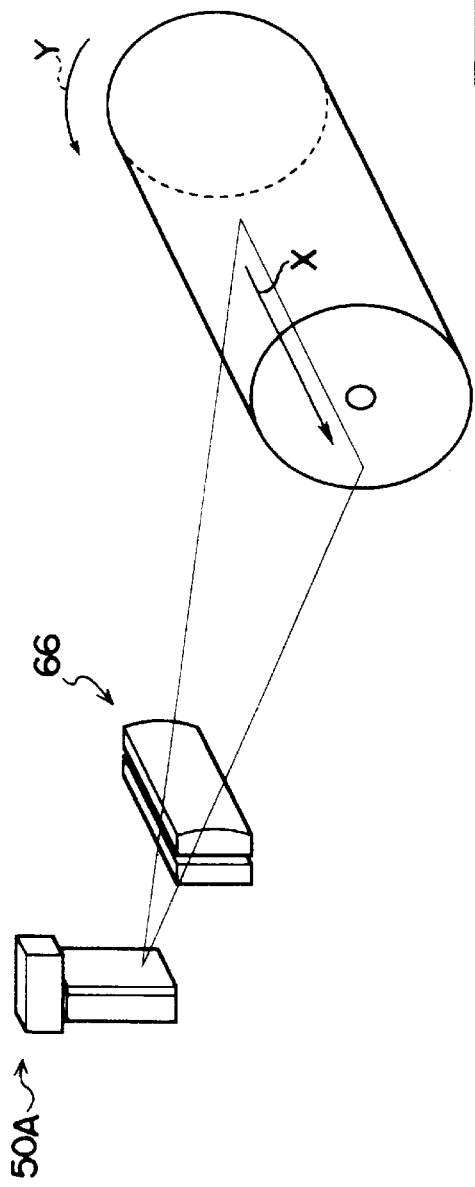
FIGS. 8A and 8B are schematic views showing the arrangement of an image forming apparatus using an optical scanning device according to a comparative embodiment.
Figure 8B:
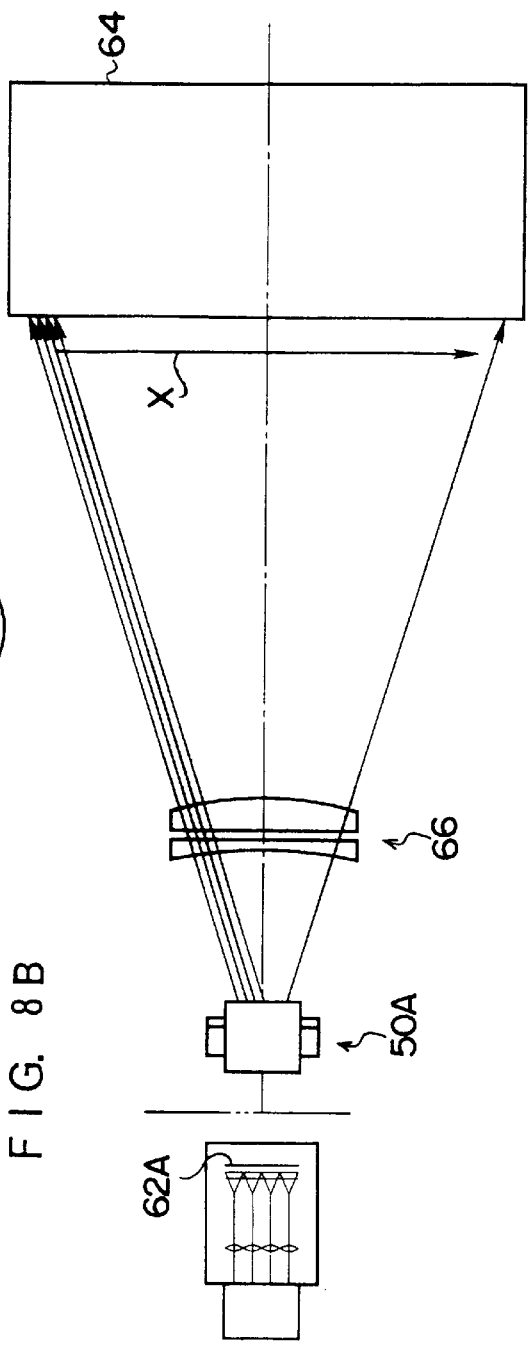

The applicants performed an experiment using the following optical scanning device 50 as another comparative embodiment. As shown in FIGS. 8A and 8B, although the optical scanning device 50 has almost the same arrangement in the above embodiment, the optical scanning device 50 uses a semiconductor laser 52 serving as four-spot laser diode array, and has a single grating 62A formed therein.

In the optical scanning device 50, the semiconductor laser 52 is directly fixed to the end face of the PLZT thin-film optical waveguide to perform coupling. An incident laser beam is deflected in the same manner as that in the above embodiment. As shown in FIG. 8B, the deflected laser beam is emitted by a single grating 62A for emitting a laser beam out of the optical waveguide. The emitted laser beam scans and exposes a photosensitive member through an optical system such as a lens. As the performance of the device of this comparative embodiment, although the four-spot laser diode array is used, in laser scanning for exposing the photosensitive member through the optical system such as a lens, jump scanning in the sub-scanning direction (direction indicated by an arrow Y in FIG. 8) of the photosensitive drum or four-line simultaneous scanning cannot be performed. For this reason, only the same performance as in the case of a single spot laser diode can be obtained. As a result, printing of 1,200 dot/inch for A4 paper at 20 sheet/min is an upper limit because the modulation rate of a laser drive is 300 Mbps.

[Second Embodiment]

The second embodiment will be described below. This embodiment has substantially the same arrangement as that of the first embodiment. For this reason, the same reference numerals as in the first embodiment denote the same parts in the second embodiment, and a description thereof will be omitted.

Figure 9:
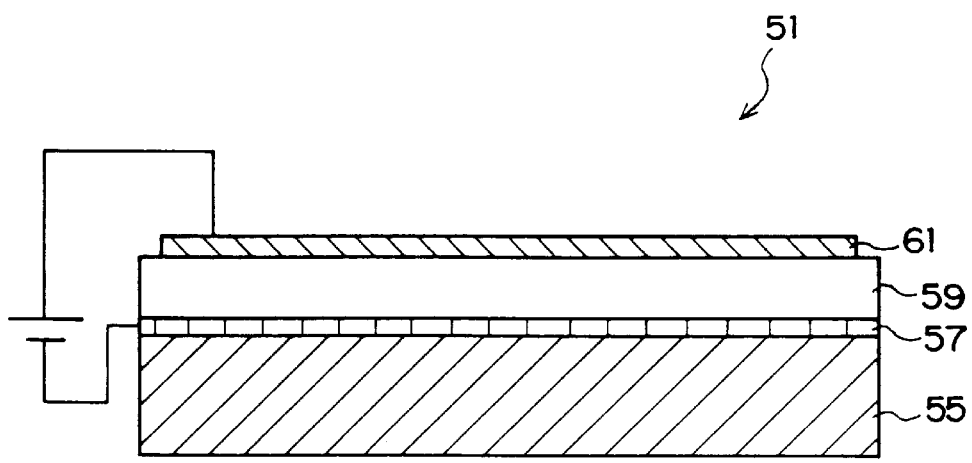
FIG. 9 is a schematic view showing an optical scanning device according to the second embodiment.

An optical scanning device 51 according to this embodiment will be manufactured in the following manner. That is, as shown in FIG. 9, a (0001) high-orientation Al-doped ZnO conductive thin film 57 having a resistivity of about 1 mΩcm is grown on a sapphire (0001) single-crystal substrate 55 serving as an insulator by RF magnetron sputtering, and a (0001) high-orientation $LiNbO_3$ thin-film optical waveguide 59 is grown. Twenty-five prism-shaped polarization domain inversion portions 31 (FIG. 10) on the $LiNbO_3$ thin-film optical waveguide 59, and an ITO transparent conductive oxide thin film 61 having a thickness of about 100 nm and a resistivity of about 1 mΩcm is formed on the LiNbO$_3$ thin-film optical waveguide 59. The ITO transparent conductive oxide thin film 61 functions as an upper electrode, and Al-doped ZnO conductive thin film 57 functions as a lower electrode.

Figure 10:
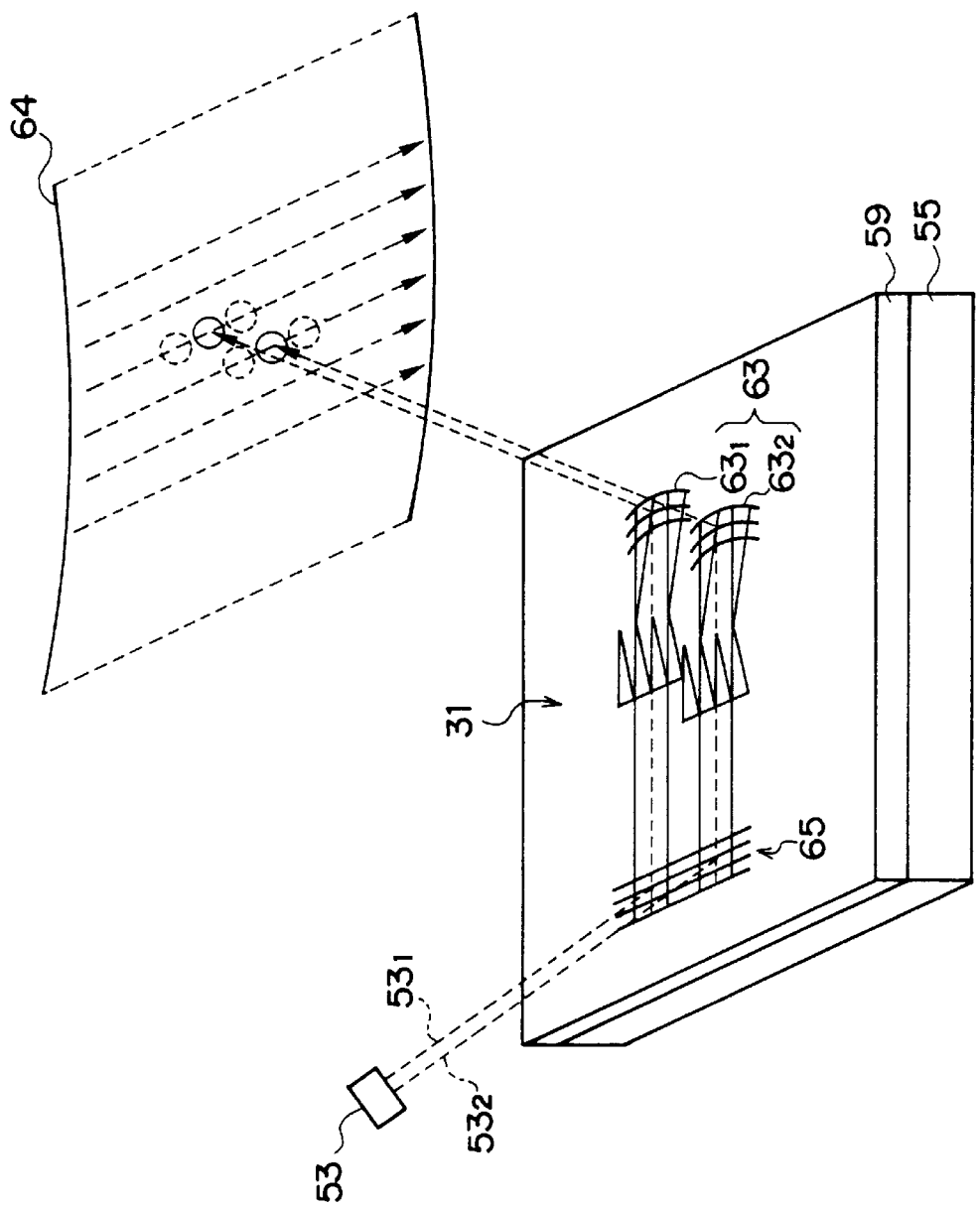
FIG. 10 is a schematic view showing the arrangement of an image forming apparatus using the optical scanning device according to the second embodiment.

As shown in FIG. 10, the optical scanning device 51 according to this embodiment comprises a light source 53. The light source 53 uses a dual spot laser diode array having a wavelength of 780 nm and an output of 20 mW to emit two laser beams, and collimates two laser beams $53_1$ and $53_2$ (to width D=16 mm). On the emission side of the light source 53, the substrate 55 on which the thin-film optical waveguide 59 are formed is arranged.

On the incident side of the thin-film optical waveguide 59, the gratings 65 for guiding the laser beams $53_1$ and $53_2$ into the optical waveguide 59 are arranged. On the downstream side of the thin-film optical waveguide 59 in the propagation direction of the laser beams, gratings $63_1$ and $63_2$ for emitting the laser beams out of the thin-film optical waveguide 59 are arranged for the laser beams $53_1$ to $53_4$, respectively.

The gratings $63_1$ and $63_2$ are formed to emit the laser beams at the same emission angle out of the thin-film optical waveguide 59, and are arranged at predetermined intervals in the propagation direction of the laser beams.

An operation of the image forming apparatus according to this embodiment will be described below.

The two laser beams $53_1$ and $53_2$ emitted from the light source 53 and collimated are guided to the thin-film optical waveguide 59 through the gratings 65. Since the LiNbO$_3$ thin-film optical waveguide 59 has a refractive index larger than those of the ITO transparent conductive oxide thin film 61 and the Al-doped ZnO conductive thin film 57, the incident laser beams are confined in the LiNbO$_3$ thin-film optical waveguide 59. The incident laser beams are deflected such that an electro-optic effect (Pockels effect) generated by applying a voltage across the upper electrode constituted by the ITO transparent conductive oxide thin film 61 and the lower electrode constituted by the Al-doped ZnO conductive thin film 57 makes the refractive index of the prism-shaped domain inversion portions 31 and the refractive index of the other portion different from each other. The prism-shaped domain inversion portions 31 are spaced apart by from the incident laser beams by different distances in a propagation direction of the light beams. The deflected laser beams are emitted out of the optical waveguide 59 by the gratings 63 arranged for the respective laser beams at the predetermined intervals in the propagation direction of the laser beams.

In this manner, the deflected laser beams are emitted from the gratings 63, and reach a photosensitive member 64 through a focusing optical system 66 such as an fθ lens to expose the photosensitive member 64. Deflection in the optical scanning device 51 is defined as main scanning, and the same deflection is simultaneously performed to the laser beams, and sub-scanning is performed by rotation of the photosensitive member 64. In this case, simultaneous scanning (jump scanning) for each two lines is performed on the photosensitive member 64.

The laser beams reached the gratings 63 have almost the same emission angle, and are emitted from different positions arranged at predetermined intervals in the propagation direction of the laser beams. Therefore, the laser beams emitted from the optical scanning device 51 become two almost parallel laser beams having the same direction (FIG. 10). Since these laser beams can be simultaneously subjected to deflection (main scanning), two laser beams having the same direction and kept parallel are emitted from the optical scanning device 51. Therefore, a complex adjusting apparatus need not be arranged, and fine adjustment of optical axes need not be performed. For this reason, by only focusing the laser beams on the photosensitive member 64 through the focusing optical system 66, scanning can be performed while keeping a predetermined scan-line interval.

[Third Embodiment]

The third embodiment of the present invention will be described below. This embodiment has substantially the same arrangement as that of the first or second embodiment. For this reason, the same reference numerals as in the first or second embodiment denote the same parts in the third embodiment, and a description thereof will be omitted.

An optical scanning device 70 according to this embodiment will be manufactured in the following manner. That is, as shown in FIG. 11, an optical waveguide 76 formed by diffusing Ti into an LiNbO$_3$ single-crystal substrate 74 is used. Twenty-five prism-shaped polarization domain inversion portions 72 on the LiNbO$_3$ thin-film optical waveguide 72, and an ITO transparent conductive oxide thin film 80 having a thickness of about 100 nm and a resistivity of about 1 mΩcm and functioning as an upper electrode is formed on the LiNbO$_3$ thin-film optical waveguide 76, and an Al electrode 81 functioning as a lower electrode is formed on the lower surface of the LiNbO$_3$ single-crystal substrate 74.

The optical scanning device 70 comprises a light source 44. The light source 44 comprises a four-spot type semi-conductor laser 52, and emits four laser beams and collimates four laser beams $44_1$–$44_4$ (to width D=16 mm). On the emission side of the light source 44, the substrate 74 on which the optical waveguide 76 manufactured as described above is formed is arranged.

On the incident side of the laser beams of the thin-film optical waveguide 76, a prism coupling 78 for guiding the four laser beams $44_1$–$44_4$ emitted from the light source into the optical waveguide 76 is arranged. On the downstream side of the thin-film optical waveguide 76 in the propagation direction of the laser beams, gratings $82_1$–$82_4$ for emitting the laser beams out of the thin-film optical waveguide 76 are arranged for the laser beams $44_1$–$44_4$, respectively.

The gratings $82_1$–$82_4$ are arranged at equal intervals in the propagation direction of the laser beams, and are formed to emit the laser beams at different emission angles. More specifically, the gratings $82_1$–$82_4$ are arranged at equal intervals in the propagation direction of the laser beam, and are formed by TiO$_2$ diffraction gratings having different grating cycles formed such that Ti is deposited, patterned, and then oxidized to obtain different emission angles.

The respective emission angles of the gratings $82_1$–$82_4$ are preferably set such that the differences between the emission angles of adjacent gratings are equal to each other. When a plurality of gratings are arranged, the emission angles are arranged in the ascending order, the emission angles are preferably set such that the differences between the emission angles of adjacent gratings are equal to each other.

An operation of the image forming apparatus according to this embodiment will be described below.

In the optical scanning device 70, four laser beams emitted from the four laser diodes and collimated are emitted from the light source 44. The laser beams emitted from the light source 44 are guided into the optical waveguide 76 by the prism coupling 78. The respective laser beams being incident on the optical waveguide 76 reach the corresponding gratings 82, and the laser beams are emitted out of the optical waveguide 76. In this case, the incident laser beams are deflected such that the refractive index of each prism-shaped polarization domain inversion portion 72 is different from the refractive index of the other portion due to a Pockels effect, and the deflected laser beams reach the gratings 82 corresponding to the laser beams, respectively. On the downstream side of the optical waveguide 76 in the propagation direction of the laser beam, gratings $82_1$–$82_4$ for emitting the laser beams out of the thin-film optical waveguide 76 are arranged for the laser beams $44_1$–$44_4$, respectively. The deflected four laser beams are emitted at different emission angles by the gratings 82 arranged at predetermined intervals, i.e., emitted at different emission from almost the same position in the propagation direction of the laser beams out of the optical waveguide 76.

The deflected laser beams are emitted by the gratings 82. As shown in FIGS. 12A and 12B, the laser beams reach the photosensitive member 64 through the focusing optical system 66 such as an fθ lens to expose the photosensitive member 64. Deflection in the optical scanning device 70 is defined as main scanning (scanning in a direction indicated by an arrow X in FIG. 12A), and the same deflection is simultaneously performed to the laser beams, and sub-scanning (scanning in a direction indicated by an arrow Y in FIG. 12A) is performed by rotation of the photosensitive member 64. In this case, simultaneous scanning (jump scanning) for each four lines is performed on the photosensitive member 64.

The deflected laser beams reaching the gratings 82 are emitted in a direction perpendicular to the propagation direction of the laser beams, and are emitted at different emission angles. For this reason, the laser beams emitted from the optical scanning device 70 become four laser beams having different directions (FIG. 11). Therefore, spots are formed at positions depending on the different emission angles on the photosensitive member 64. Since these laser beams can be simultaneously subjected to deflection (main scanning), the laser beams shifted from each other at predetermined intervals in the sub-scanning direction and focused on the photosensitive member 64, and the four laser beams keeping this state are scanned. Therefore, a complex adjusting apparatus in which a plurality of laser beams are simultaneously scanned and the scan-line interval of several tens microns is kept with respect to the image surface of the photosensitive member 64 to prevent ununiformity is not required, and fine adjustment of optical axes need not be performed. For this reason, by only focusing the laser beams on the photosensitive member 64 through the focusing optical system 66, scanning can be performed while keeping a predetermined scan-line interval.

In this embodiment, since the gratings for emitting the laser beams propagating in the optical waveguide out of the optical waveguide are arranged at the same position in the propagation direction of the laser beams, the device can be decreased in size.

As has been described above, in an optical waveguide type optical scanning device according to the above embodiments, a plurality of laser beams can be subjected to simultaneous scanning or jump scanning. For this reason, a problem of the upper limit of the laser recording rate posed by the limit of the modulation rate of a laser driver can be solved, and the range of an application of the optical scanning device to, e.g., a laser printer, a digital copying machine, or a facsimile can be widened.

When a light source having a semiconductor laser which can emit a plurality of laser beams is used, a problem associated with a laser exposure energy density loss on a photosensitive member due to loss caused by coupling of a laser beam to the optical waveguide, loss caused by scattering or the like of a laser beam in the optical waveguide, loss of a laser beam from the optical waveguide in an output operation, and the like is solved.

In addition, when, as emission means such as gratings for emitting deflected laser beams out of an optical waveguide, a plurality of emission means having different emission angles are arranged at the same position in the propagation direction of the incident laser beams, the optical scanning device can be decreased in size. When the emission means have the same emission angle and are arranged at predetermined intervals, the positional accuracy between the emitted laser beams can be improved.

When an image forming apparatus uses the optical scanning device as an exposure means for exposing a photosensitive member, an image can be formed at a very high scanning rate without ununiformity.

What is claimed is:

1. An optical scanning device, comprising:

an optical waveguide constituted by a thin film;

a light source for emitting a plurality of light beams into said optical waveguide, each of said light beams entering said optical waveguide at an incident position;

a plurality of collimator means for collimating the light beams in said optical waveguide;

a plurality of deflection means for deflecting the light beams in said optical waveguide by using an electro-optic effect which distributes a refractive index of said optical waveguide according to externally applied input signals supplied to said deflection means to cause diffraction of said light beams by the distributed refractive index, said plurality of deflection means each receiving a respective one of said plurality of light beams collimated by a respective one of said plurality of collimator means and said plurality of deflection means each being arranged relative to said optical waveguide to deflect a respective one of said plurality of light beams in said optical waveguide, each of the plurality of deflection means including;

a prism-shaped polarization domain inversion region formed in said optical waveguide with two sides being not parallel to each other and a plurality of electrodes positioned on both sides of said optical waveguide and each of said plurality of deflection means applies voltage across said plurality of electrodes to generate different refractive indexes in the prism-shaped polarization domain inversion region thereby distributing the refractive index, each said prism-shaped polarization domain inversion region of a respective one of said plurality of deflection means being arranged at positions spaced apart from said incident positions of said light beams by different distances in a propagation direction of said plurality of light beams; and a plurality of emission means for emitting the deflected light beams form said optical waveguide, said plurality of emission means each being arranged to emit a respective one of said plurality of light beams deflected by a respective one of said plurality of deflection means.

2. An optical scanning device according to claim 1, wherein said light source is formed on a single substrate, and is a laser array for emitting said plurality of light beams.

3. An optical scanning device according to claim 1, wherein said plurality of emission means are arranged at positions spaced apart from said incident positions of each of said light beams by different distances in said propagation direction of the plurality of light beams, and emit the light beams at substantially a same emission angle.

4. An optical scanning device according to claim 3, wherein said plurality of emission means include at least three emission means, and the positions of said at least three emission means are spaced apart from said incident positions of each of said light beams by the different distances and are arranged at equal intervals in the propagation direction of the light beams.

5. An optical scanning device according to claim 1, wherein said emission means are gratings.

6. An optical scanning device according to claim 1, wherein said emission means are prisms.

7. An optical scanning device, comprising:
an optical waveguide constituted by a thin film;
a light source for emitting a plurality of light beams into said optical waveguide, each of said light beams entering said optical waveguide at an incident position;
a plurality of collimator means for collimating the light beams in said optical waveguide;
a plurality of deflection means for deflecting the light beams in said optical waveguide by using an electro-optic effect which distributes a refractive index of said optical waveguide according to externally applied input signals supplied to said deflection means to cause diffraction of said light beams by the distributed refractive index, said plurality of deflection means each receiving a respective one of said plurality of light beams collimated by a respective one of said plurality of collimator means and said plurality of deflection means each being arranged relative to said optical waveguide to deflect a respective one of said plurality of light beams in said optical waveguide; and
a plurality of emission means for emitting the deflected light beams from said optical waveguide, said plurality of emission means each being arranged to emit a respective one of said plurality of light beams deflected by a respective one of said plurality of deflection means; wherein said plurality of emission means are arranged at positions spaced apart from said incident positions of each of said light beams by substantially a same distance in a propagation direction of the plurality of light beams, and emit the plurality of light beams at different emission angles which are always directed at different points on a surface.

8. An optical scanning device according to claim 7, wherein, said plurality of emission means include at least three emission means, and said at least three emission means are arranged such that differences between adjacent emission angles are substantially equal to each other when the emission angles are arranged in an ascending order.

9. An optical scanning device according to claim 7, wherein each of the plurality of deflection means includes a prism-shaped polarization domain inversion region formed in said optical waveguide with two sides being not parallel to each other and a plurality of electrodes positioned on both sides of said optical waveguide and each of said plurality of deflection means applies voltage across said plurality of electrodes to generate different refractive indexes in the prism-shaped polarization domain inversion region thereby distributing the refractive index.

10. An optical scanning device according to claim 7, wherein each of the plurality of deflection means includes a plurality of electrodes, with said electrodes having a prism-shaped pattern with two sides being not parallel to each other and said optical waveguide being positioned with said electrodes on one side and a conductive substrate on an opposite side of said optical waveguide, and each of the deflection means applies voltage between said plurality of electrodes and said conductive substrate to generate regions with different refractive indexes corresponding to a pattern of the electrodes, thereby distributing the refractive index.

11. An image forming apparatus which has a photosensitive member for forming an image, charging means for uniformly charging said photosensitive member, exposure means for irradiating light on said photosensitive member to form a latent image, and developing means for making the latent image visible,
said exposure means comprises:
an optical waveguide constituted by a thin film;
a light source for emitting a plurality of light beams into said optical waveguide;
a plurality of collimator means for collimating the light beams in said optical waveguides;
a plurality of deflection means for deflecting the light beams in said optical waveguide by using an electro-optic effect which distributes a refractive index of said optical waveguide according to externally applied input signals supplied to said deflection means to cause diffraction of said light beams by the distributed refractive index, said plurality of deflection means each receiving a respective one of said plurality of light beams collimated by a respective one of said plurality of collimator means and said plurality of deflection means each being arranged relative to said optical waveguide to deflect a respective one of said plurality of light beams in said optical waveguide, each of the plurality of deflection means including;
a prism-shaped polarization domain inversion region formed in said optical waveguide with two sides being not parallel to each other and a plurality of electrodes positioned on both sides of said optical waveguide and each of said plurality of deflection means applies voltage across said plurality of electrodes to generate different refractive indexes in the prism-shaped polarization domain inversion region thereby distributing the refractive index, each said prism-shaped polarization domain inversion region of a respective one of said plurality of deflection means being arranged at positions spaced apart from said incident positions of said light beams by different distances in a propagation direction of said plurality of light beams; and
a plurality of emission means for emitting the deflected light beams form said optical waveguide, said plurality of emission means each being arranged to emit a respective one of said plurality of light beams deflected by a respective one of said plurality of deflection means.

12. An optical scanning device, comprising:
an optical waveguide constituted by a thin film;
a light source for emitting a plurality of light beams into said optical waveguide, each of said light beams entering said optical waveguide at an incident position;
a plurality of collimator means for collimating the light beams in said optical waveguide;
a plurality of deflection means for deflecting the light beams in said optical waveguide by using an electro-optic effect which distributes a refractive index of said optical waveguide according to externally applied input signals supplied to said deflection means to cause diffraction of said light beams by the distributed refractive index, said plurality of deflection means each receiving a respective one of said plurality of light beams collimated by a respective one of said plurality of collimator means and said plurality of deflection means each being arranged relative to said optical waveguide to deflect a respective one of said plurality of light beams in said optical waveguide, each of the plurality of deflection means including;

a plurality of electrodes, with said electrodes having a prism-shaped pattern with two sides being not parallel to each other and said optical waveguide being positioned with said electrodes on one side and a conductive substrate on an opposite side of said optical waveguide, and each of the deflection means applies voltage between said plurality of electrodes and said conductive substrate to generate regions with different refractive indexes corresponding to a pattern of the electrodes, thereby distributing the refractive index, each of the plurality of electrodes of a respective one of said plurality of deflection means being arranged at positions spaced apart from said incident positions of said light beams by different distances in a propagation direction of said plurality of light beams; and a plurality of emission means for emitting the deflected light beams form said optical waveguide, said plurality of emission means each being arranged to emit a respective one of said plurality of light beams deflected by a respective one of said plurality of deflection means.

13. An optical scanning device according to claim 12, wherein said plurality of emission means are arranged at positions spaced apart from said incident positions of each of said light beams by different distances in said propagation direction of the plurality of light beams, and emit the light beams at substantially a same emission angle.

14. An optical scanning device according to claim 13, wherein said plurality of emission means include at least three emission means, and the positions of said at least three emission means are spaced apart from said incident positions of each of said light beams by the different distances and are arranged at equal intervals in the propagation direction of the light beams.

15. An optical scanning device according to claim 12, wherein said emission means are gratings.

16. An optical scanning device according to claim 12, wherein said emission means are prisms.

17. An image forming apparatus which has a photosensitive member for forming an image, charging means for uniformly charging said photosensitive member, exposure means for irradiating light on said photosensitive member to form a latent image, and developing means for making the latent image visible, said exposure means comprises:

an optical waveguide constituted by a thin film;

a light source for emitting a plurality of light beams into said optical waveguide;

a plurality of deflection means for deflecting the light beams in said optical waveguide by using an electrooptic effect which distributes a refractive index of said optical waveguide according to externally applied input signals supplied to said deflection means to cause diffraction of said light beams by the distributed refractive index, said plurality of deflection means each receiving a respective one of said plurality of light beams collimated by a respective one of said plurality of collimator means and said plurality of deflection means each being arranged relative to said optical waveguide to deflect a respective one of said plurality of light beams in said optical waveguide, each of the plurality of deflection means including;

a plurality of electrodes, with said electrodes having a prism-shaped pattern with two sides being not parallel to each other and said optical waveguide being positioned with said electrodes on one side and a conductive substrate on an opposite side of said optical waveguide, and each of the deflection means applies voltage between said plurality of electrodes and said conductive substrate to generate regions with different refractive indexes corresponding to a pattern of the electrodes, thereby distributing the refractive index, each of the plurality of electrodes of a respective one of said plurality of deflection means being arranged at positions spaced apart from said incident positions of said light beams by different distances in a propagation direction of said plurality of light beams; and a plurality of emission means for emitting the deflected light beams form said optical waveguide, said plurality of emission means each being arranged to emit a respective one of said plurality of light beams deflected by a respective one of said plurality of deflection means.

* * * * *